(12) United States Patent
Lund

(10) Patent No.: US 12,458,340 B2
(45) Date of Patent: Nov. 4, 2025

(54) TAPETAK AND METHODS OF ANCHORING SOFT TISSUE TO BONE

(71) Applicant: LMD Innovations, LLC, Ingleside, IL (US)

(72) Inventor: Jereme Lund, Ingleside, IL (US)

(73) Assignee: LMD Innovations, LLC, Ingleside, IL (US)

(*) Notice: Subject to any disclaimer, the term of this patent is extended or adjusted under 35 U.S.C. 154(b) by 311 days.

(21) Appl. No.: 18/138,096

(22) Filed: Apr. 23, 2023

(65) Prior Publication Data

US 2023/0338017 A1 Oct. 26, 2023

Related U.S. Application Data

(60) Provisional application No. 63/334,165, filed on Apr. 24, 2022.

(51) Int. Cl.
A61B 17/04 (2006.01)

(52) U.S. Cl.
CPC .. *A61B 17/0401* (2013.01); *A61B 2017/0409* (2013.01); *A61B 2017/0464* (2013.01)

(58) Field of Classification Search
CPC ........ A61B 17/0401; A61B 2017/0464; A61B 2017/0409; A61B 17/06166; A61B 2017/0414; A61B 2017/042; A61B 2017/0459; A61B 17/0466; A61B 2017/0446; A61B 2017/0406; A61B 2017/0417; A61F 2002/0823; A61F 2/0811
See application file for complete search history.

(56) References Cited

U.S. PATENT DOCUMENTS

| | | | |
|---|---|---|---|
| 10,575,842 B2 | 3/2020 | Lund | |
| 10,646,327 B2 | 5/2020 | Lund | |
| 2007/0010857 A1* | 1/2007 | Sugimoto | A61B 17/00234 606/232 |
| 2009/0318961 A1* | 12/2009 | Stone | A61B 17/0401 606/228 |
| 2012/0239085 A1* | 9/2012 | Schlotterback | A61B 17/0401 606/228 |
| 2013/0096612 A1 | 4/2013 | ZZajac et al. | |
| 2013/0131722 A1* | 5/2013 | Marchand | A61B 17/0401 606/232 |
| 2014/0243893 A1* | 8/2014 | Santangelo | A61B 17/0401 606/232 |
| 2016/0270777 A1* | 9/2016 | Miller | A61B 17/0401 |
| 2017/0181739 A1* | 6/2017 | Breslich | A61B 17/0401 |
| 2019/0038277 A1* | 2/2019 | Meister | A61B 17/0401 |
| 2021/0219971 A1* | 7/2021 | Son | A61B 17/84 |
| 2022/0142637 A1* | 5/2022 | Kehoe | A61B 17/0401 |

FOREIGN PATENT DOCUMENTS

KR 102439443 B1 * 9/2022 ......... A61B 17/0401

* cited by examiner

*Primary Examiner* — Katherine Shi

(57) ABSTRACT

A flat tape suture anchor and a method of anchoring soft tissue to bone. The anchor body consists of a flat tape with a repair suture and knotless self-anchoring mechanism woven therein to form an accordion pleat that accordions when opposing counter tension is applied thereby securing same.

9 Claims, 12 Drawing Sheets

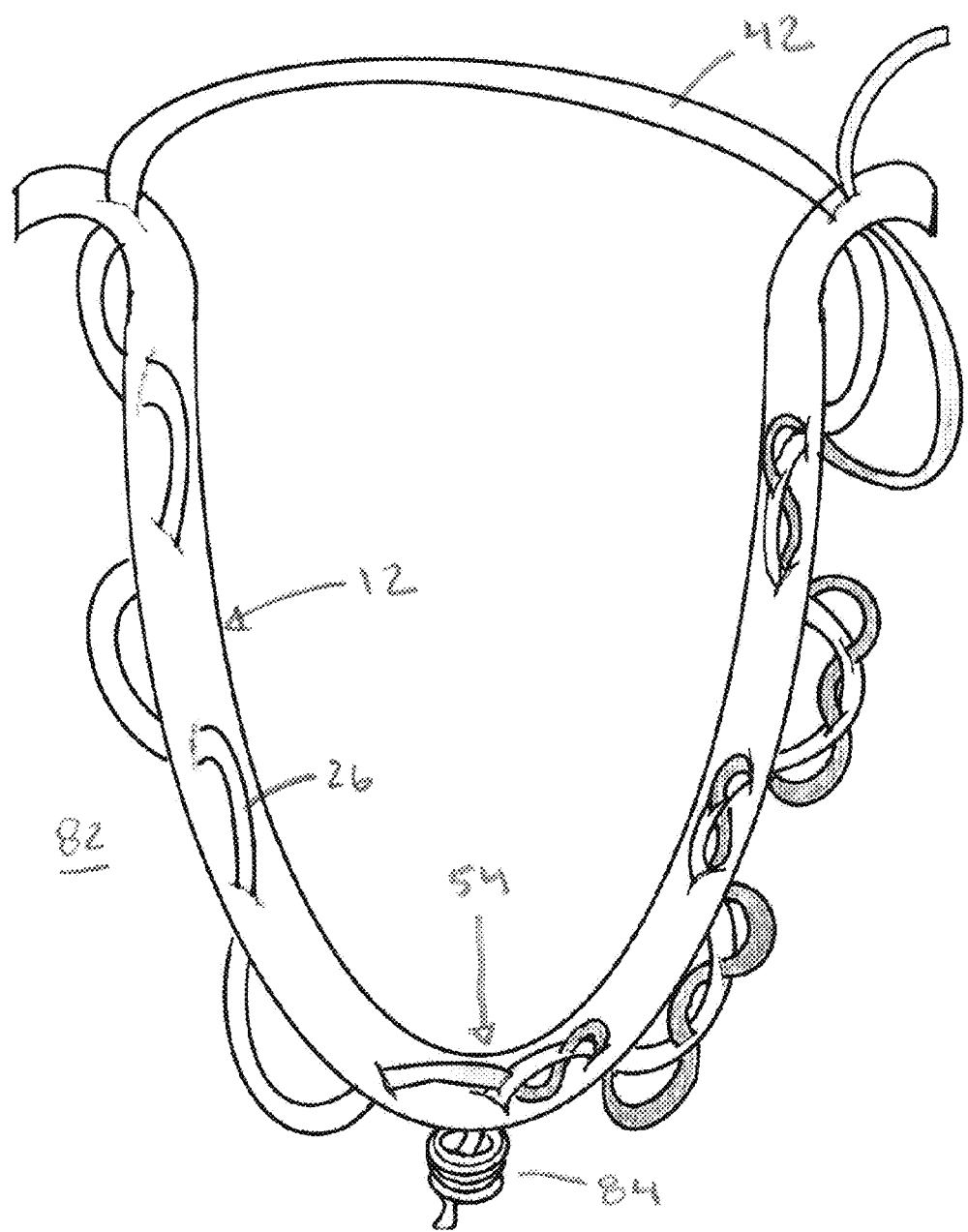

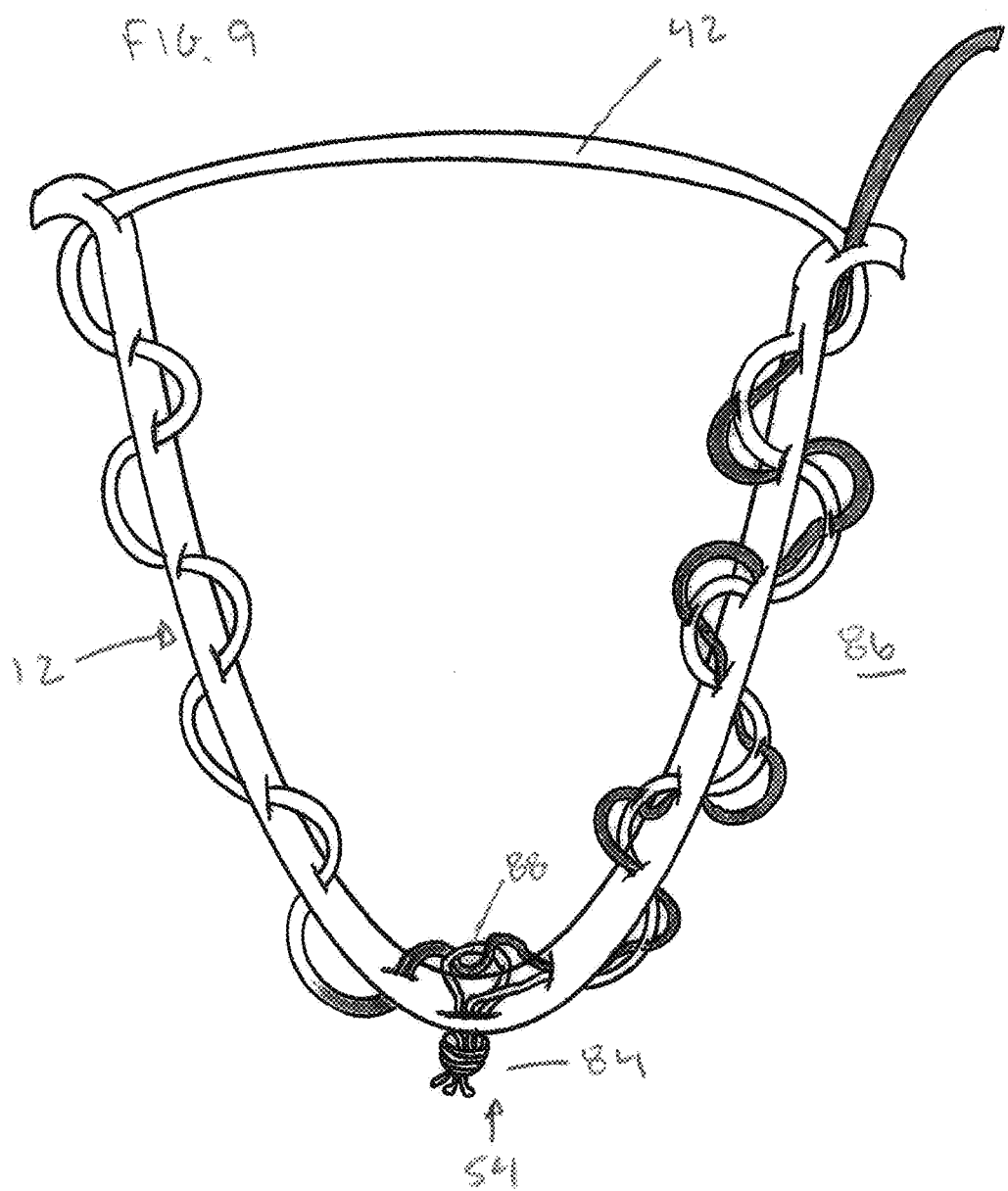

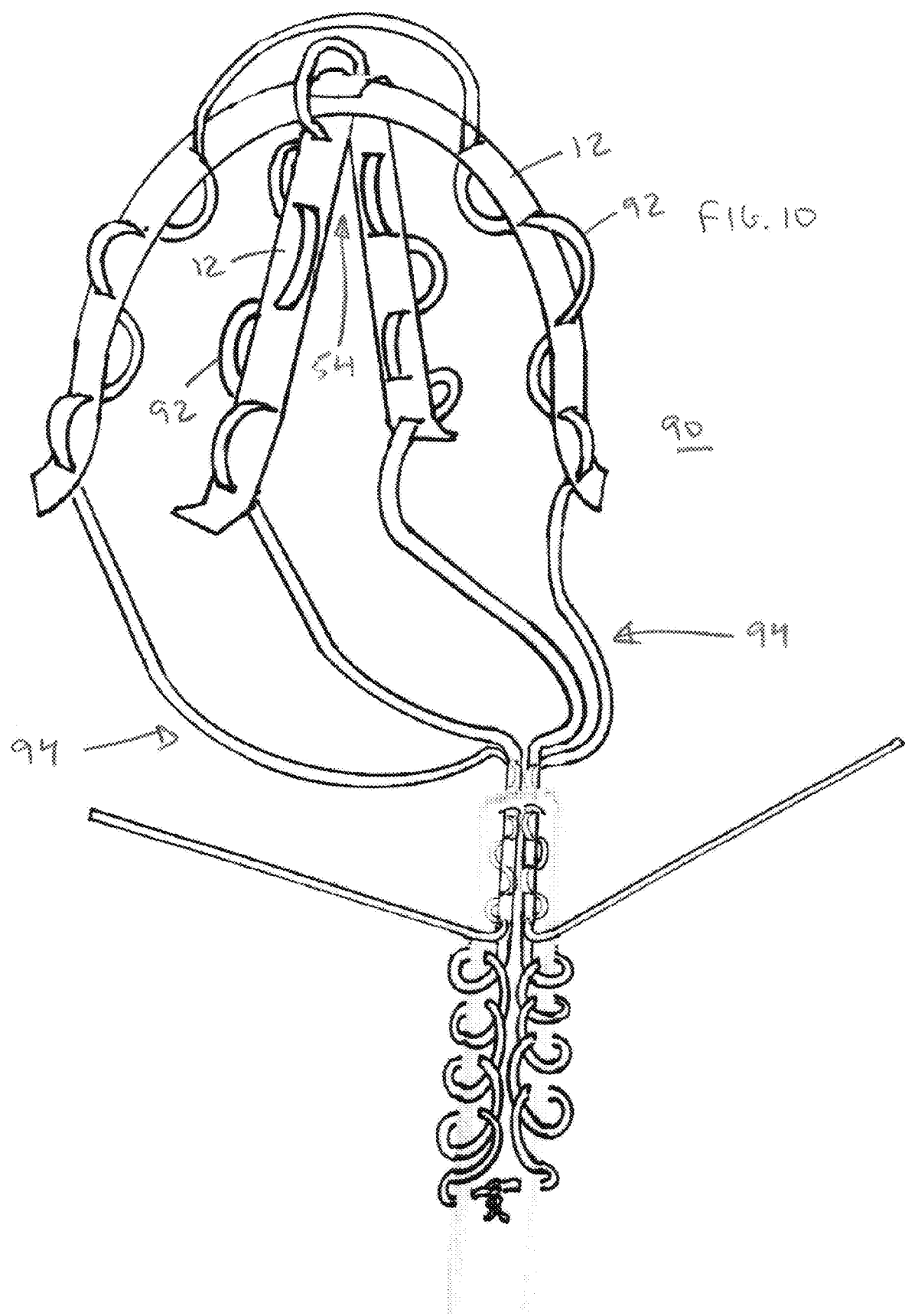

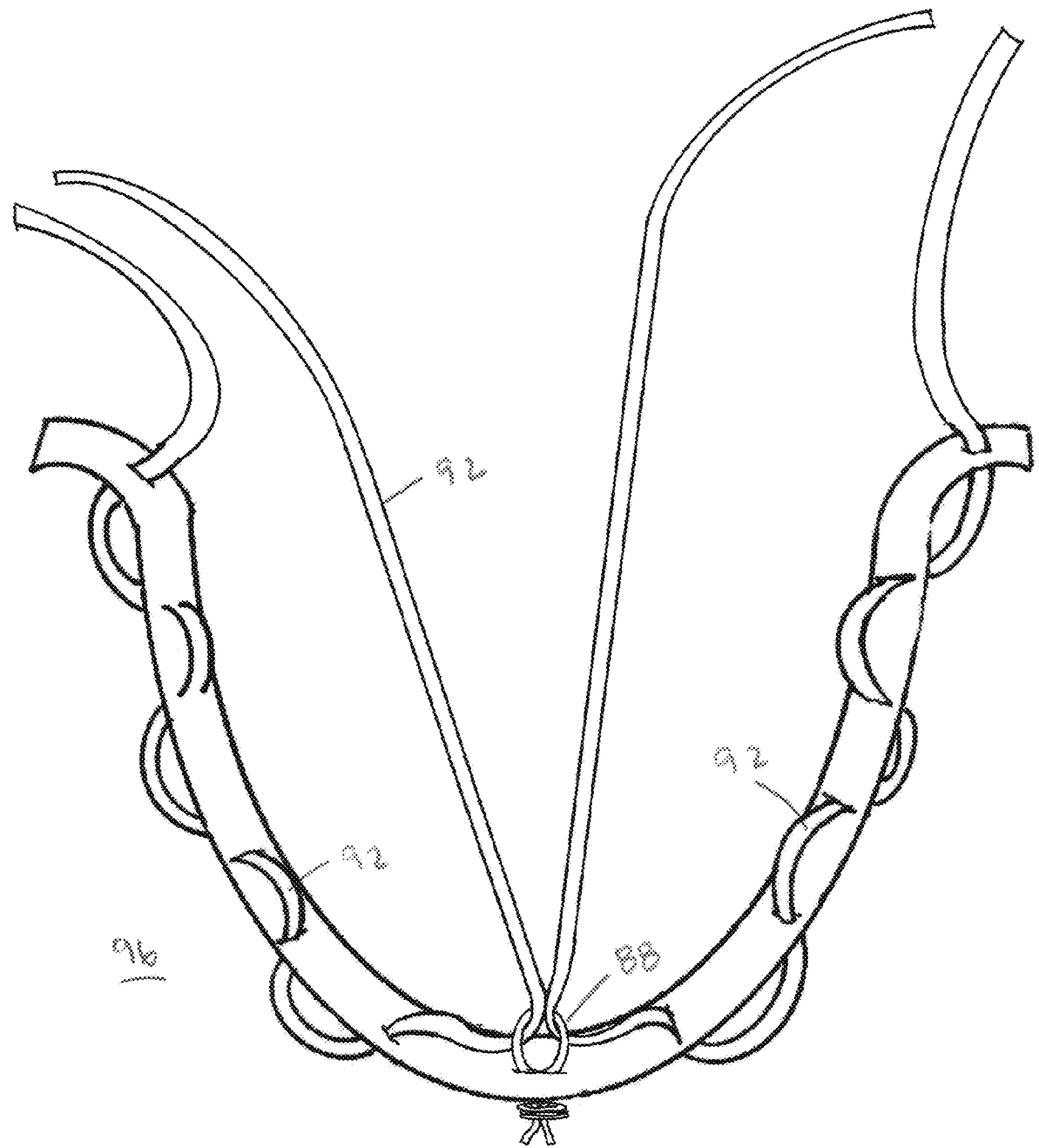

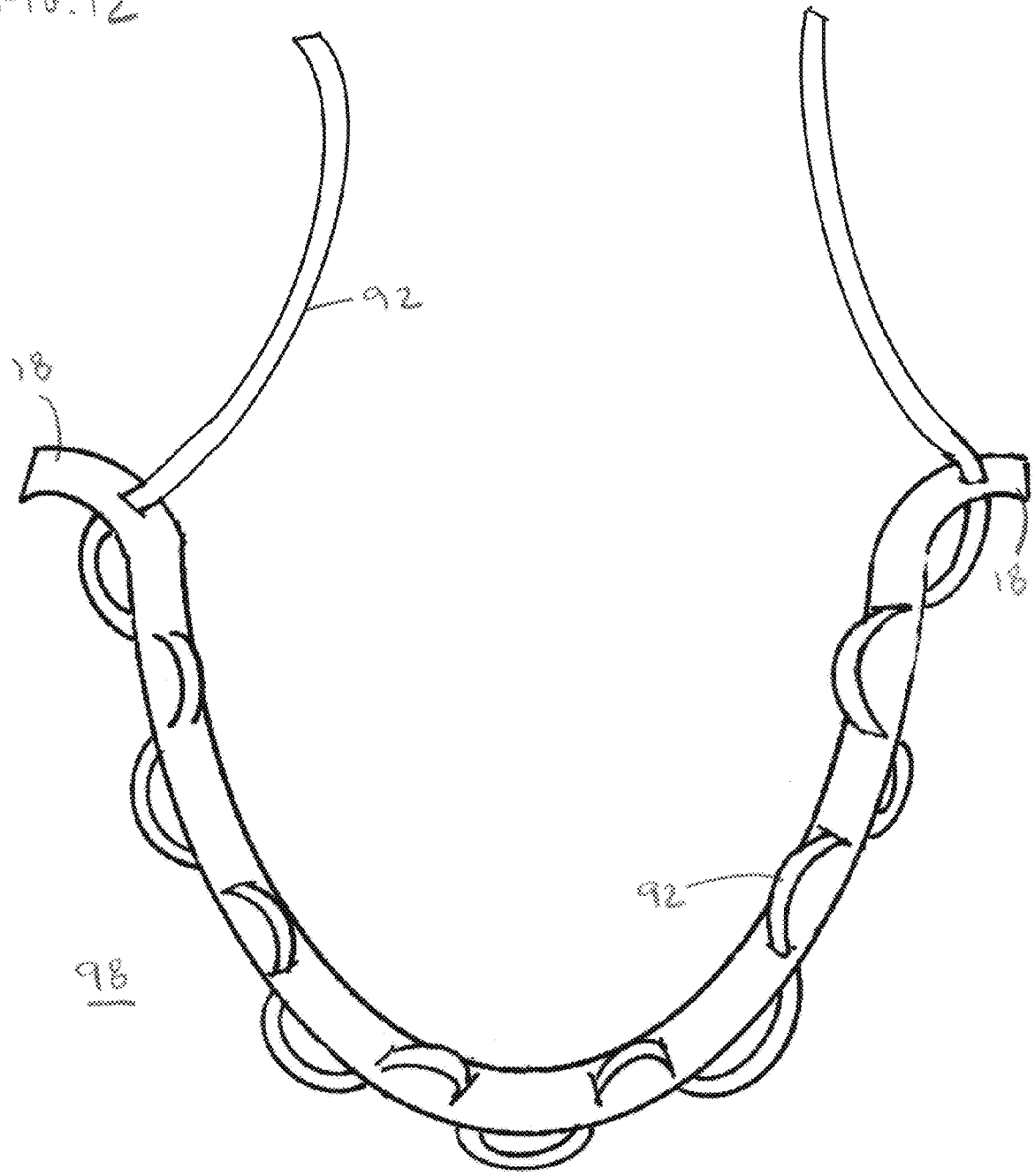

TAPETAK AND METHODS OF ANCHORING SOFT TISSUE TO BONE

CROSS-REFERENCE TO RELATED APPLICATION

This application claims the benefit of Provisional Patent Application No. 63/334,165, filed Apr. 24, 2022, which is hereby incorporated by reference in its entirety herein.

BACKGROUND OF THE INVENTION

I. Field of the Invention

The present disclosure relates generally to surgical devices and, more specifically, to knotless flat self-locking anchor constructs and associated methods of surgical repair, and in particular knotless soft tissue fixation with flat tape suture in orthopedic surgery.

II. Description of the Prior Art

Injuries to the soft tissue ligaments and/or tendons, and in particular the tearing of same from bone are caused by a variety of reasons, including but not limited to, falls vehicular accidents, and most commonly sports participation. Whatever the cause, such injuries typically do not heal on their own and need to be surgically repaired.

In order to properly repair these types of shoulder (e.g. Bankart and Superior Labrum Anterior to Posterior, rotator cuff, etc.), ankle (e.g. Anterior Talo-Fibular Ligament, Brostrom, lateral ankle reconstructions, etc.), and other body part injuries, orthopedic surgeons need to use sutures and associated constructs. The original process of repair was to drill transosseous bone tunnels, shuttle a suture through the tunnel and then tie over/through the soft tissue. This process is/was time consuming, cumbersome, difficult, required a large open incision, the suture would cut through the bone and/or tissue, the knot stack would cause irritation, and it all relied on the individual surgeon skills. Accordingly, results were likely not reproducible.

The next evolution of repair incorporated the repair sutures into a physical anchor body that is placed in the bone. These sutures anchor bodies were/are made from metal, plastic, or a suitable absorbable material. Then the sutures are passed though the tissue and a knot was tied. This technique still has the inherent issues of knot tying, irritable knot stacks and cutting through tissue, etc. Indeed, such solid anchor bodies typically necessitate a complementary sized hole for insertion, which in turn may increase surgical invasiveness. Additionally, these solid anchor bodies have been found to damage cartilage in the event they are pulled out or improperly placed on articular surfaces.

Anchor bodies may also be full suture anchors. These include those comprised of traditional round sutures that are secured by tying knots for fixation, those comprised of traditional round sutures that are secured in a knotless fashion for fixation and suture anchors comprised of flat tape sutures that are secured by tying the tape sutures in knots for fixation.

Such all-suture anchors have a significant advantage over anchors with a solid anchor body. For example, these all-suture anchors have the ability to be inserted into smaller holes, they preserve bone, are less invasive and they provide an ease of management in a revision surgery as they (again) preserve more bone and can be easily drilled through.

Furthermore, a tape or flat suture has significant advantages over traditional round sutures. For example, the flat tape spreads the compression of the tissue over a broader footprint or surface area which greatly aids the strength of the repair while reducing healing time. Additionally, a flat suture is far less susceptible to tearing through tissue as compared to the traditional round suture.

Similarly, a knotless fixation has advantages over anchoring that requires knots for fixation. For example, if the knot is too tight or loosens then the repair will eventually fail, tying knots are variable and surgeon dependent, knotless anchors provide more reproducible results and knotless anchors do not have any so-called knot stacks that cause irritation, damage and/or failure. While more producible, these knotless round sutures do not address the issue of cutting/pulling through tissue. They also have inherent pull-out strength problems. As such, a transition to a flat tape suture has greatly increased the tissue retention and pull/cut through strength.

The most beneficial suture and associated construct design is therefore a suture anchor of flat tape suture that is secured in a knotless fashion for fixation in either a solid or all suture anchor body. Such constructs are disclosed in U.S. Pat. Nos. 10,575,842 and 10,646,327, both of which are hereby incorporated by reference in their entirety herein. However, the problem with the tape suture is that there is no way to secure it in a self-locking manner allowing infinite tensioning ability. Indeed, all known methods for securing the tape suture is either tying knots or fastening in place by use of an additional anchor to secure the other end. This only allows for a single attempt of tension as once the second anchor is placed, there is no further adjustment of tension possible. Additionally, current designs incorporating so-called single tail loop type suture anchors have been found to slip back through the initial through hole and not anchor the suture in place.

Accordingly, there remains a need for a flat tape suture anchor that is secured in a knotless fashion for fixation in either a solid or all suture body. It is therefore a general object of this disclosure to provide such a suture and method.

It is another general object of the present disclosure to provide a suture and method that overcomes the deficiencies of presently available sutures and methods.

It is a more specific object of the present disclosure to provide a flat tape button to replace metal buttons in a plethora of surgeries, including ACL repair and reconstruction.

It is a more specific object of the present disclosure to provide a minimally invasive method of utilizing a flat tape suture anchor.

It is a more specific object of the present disclosure to provide a suture and method with cooperating anchor tails.

It is another more specific object of the present disclosure to provide a construct that is self-locking, tensionable and utilizes all tape sutures.

These and other objects, features and advantages of this disclosure will be clearly understood through a consideration of the following detailed description.

SUMMARY OF THE INVENTION

According to an embodiment of the present disclosure, there is provided a surgical construct for anchoring tissue, the construct having a flat flexible suture body with a suture woven therethrough at multiple points to form a weave region whereby the construct has a insertion dimension at the surgical site and a larger dimensioned when positioned and tightened.

According to an embodiment of the present disclosure there is also provided a method for anchoring tissue by drilling a tunnel through the tissue next to the injury to receive a dimensioned construct comprised of a generally flat flexible suture anchor body and a suture woven therethrough at multiple points to create a weave, loading the construct on an insertion tool, inserting the construct through the tunnel, pulling on the suture to increase the dimension and block the construct from traverses through the tunnel.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 8 is a side plan view of another embodiment according to the principles of the present disclosure.

FIG. 9 is a side plan view of another embodiment according to the principles of the present disclosure.

FIG. 10 is a side plan view of another embodiment according to the principles of the present disclosure.

FIG. 11 is a side plan view of another embodiment according to the principles of the present disclosure.

FIG. 12 is a side plan view of another embodiment according to the principles of the present disclosure.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

Generally, the subject disclosure comprises a suture anchor of flat tape sutures that are secured in a knotless fashion for fixation in either a solid or all suture anchor body. The drawings herein illustrate and detail the use of such flat tape anchorless sutures in practice. As will be detailed, the construct of the present disclosure comprises, among other things, a suture anchor comprised of an all-suture anchor body constructed from tape (flat) suture; a flat tape button provides strength to replace typical metal buttons in a multitude of surgical techniques, including ACL repair and reconstruction; a suture anchor comprised of an all-suture anchor body constructed from tape (flat) suture with a repair suture and knotless self-locking mechanism woven through the anchor body in an accordion pleat like fashion that allows the anchor to be inserted in a flat linear state whereby the anchor body then folds upon itself and "accordions" below the bone surface when opposing counter tension is applied to repair sutures; a tape (flat) suture secured knotless for fixation; a continuous flexible coupling comprised of tape (flat) material; and a continuous woven back through itself in an accordion pleat like fashion to create a knotless self-locking construct.

Figure 1:
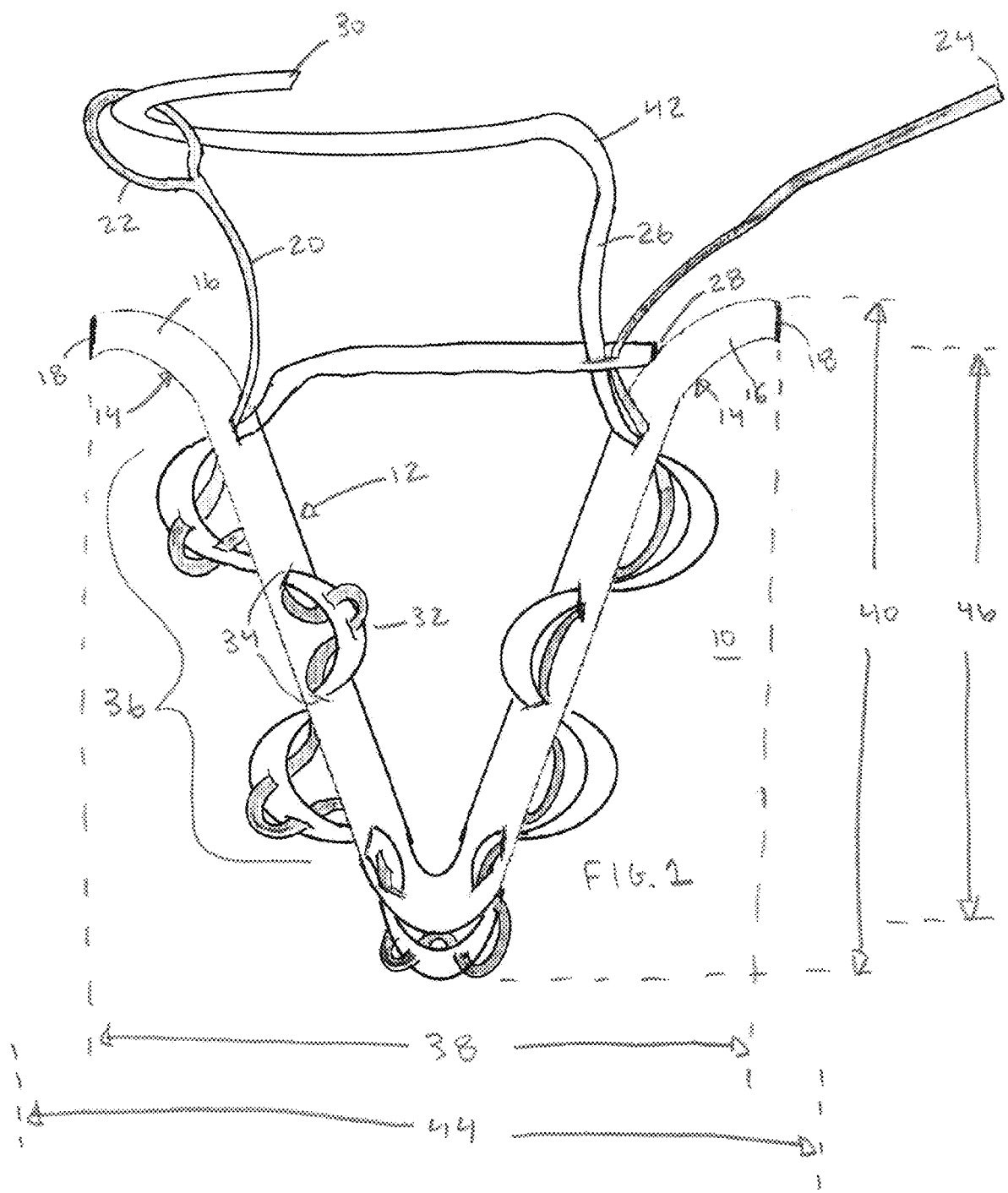
FIG. 1 is a side plan view of a flat knotless self-locking anchor construct according to an embodiment of the principles of the present disclosure.

FIG. 1 illustrates an embodiment of a flat knotless self-locking anchor construct 10. The anchor is generally flat, and while it will be appreciated that is can take many forms, in this first embodiment the anchor 12 comprises a flat flexible and generally V-shaped tape suture having an outward facing side 14, and inward facing side 16, and two ends 18; a first generally flat suture being a drive or shuttle 20 having a loop end 22 and a tail end 24; and a second generally flat suture being a repair suture 26 having a docked end 28 and a repair end 30. The ends or wings 18 of the anchor 12 are designed to catch or smudge in the bone when the anchor body 12 balls up or folds into an accordion pleat weave fashion. The suture shuttle 20 and the repair stitch 26 are woven through one another 32 and woven through 34 the anchor body 12, back and forth numerous times to form an accordion weave region 36. The suture inside of suture design creates a knotless self-locking mechanism 32 and effectively a soft anchor suture button.

Before the construct 10 is deployed for use, or when in its original or preinserted state, it has a dimension with a preloaded width 38 and a preloaded height 40. In use, and described in greater detail infra, the repair stitch end 30 is passed through or around soft tissue and/or bone then shuttled through the loop end 22 of the shuttle suture 20 to create a self-locking adjustable loop 42; and the terminal end 28 of the repair stitch 26 applies opposing counter tension to lock the adjustable loop 42. Similarly, the tail end 24 of the shuttle suture 20 is pulled to load the repair stitch 26 creating the self-locking mechanism 32 and the adjustable loop 42. Accordingly, after the construct is inserted, positioned and tightened, it is in its locked state and has a dimension with a loaded width 44 (greater than preloaded width 38) and a loaded height 46 (less than preloaded height 40). The change in width and length further define the preloaded and loaded overall size and dimension of the construct 10.

Figure 2:
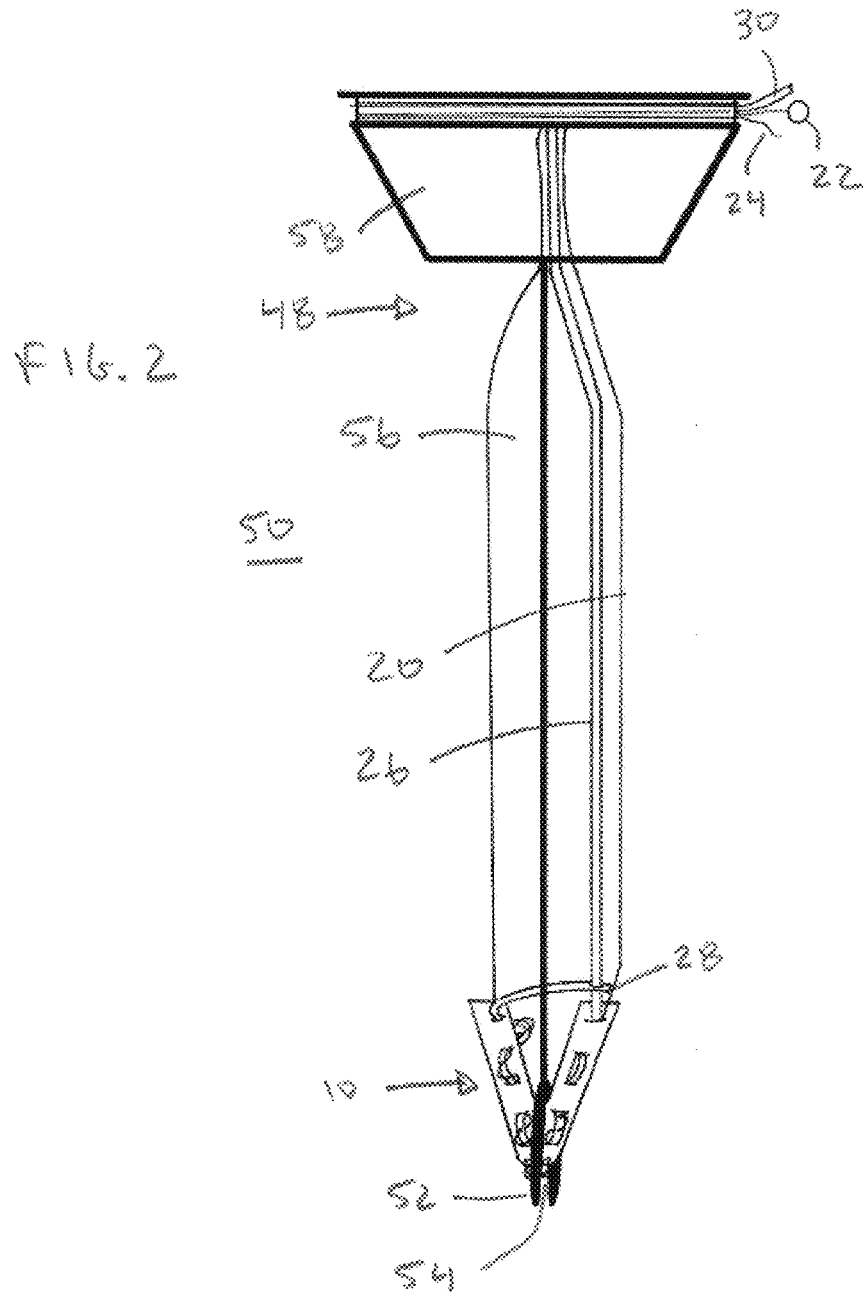
FIG. 2 is a side plan view of a surgical assembly of an embodiment of the principles of the present disclosure.

FIG. 2 depicts the flat knotless self-locking anchor construct 10 loaded to a driver or inserter assembly 48 to comprise the surgical assembly 50. The driver 48 includes a "Y" or fork tip 52 that engages an approximate middle point 54 of the anchor 12. The repair suture 26 exits the anchor 12 and traverses the longitudinal body 56 of the driver 48 and is wrapped around the head 58 of the driver 48. Similarly, the shuttle suture 20 exits the anchor 12 and traverses the longitudinal body 56 of the driver 48 and is wrapped around the head 58 of the driver 48. While the docked or terminated end 28 of the repair suture 26 remains proximate the anchor, the repair end 30 of the repair suture and the shuttle loop 22 and the shuttle tail 24 of the shuttle suture 20 exit and remain proximate the driver head 58.

Figure 3:
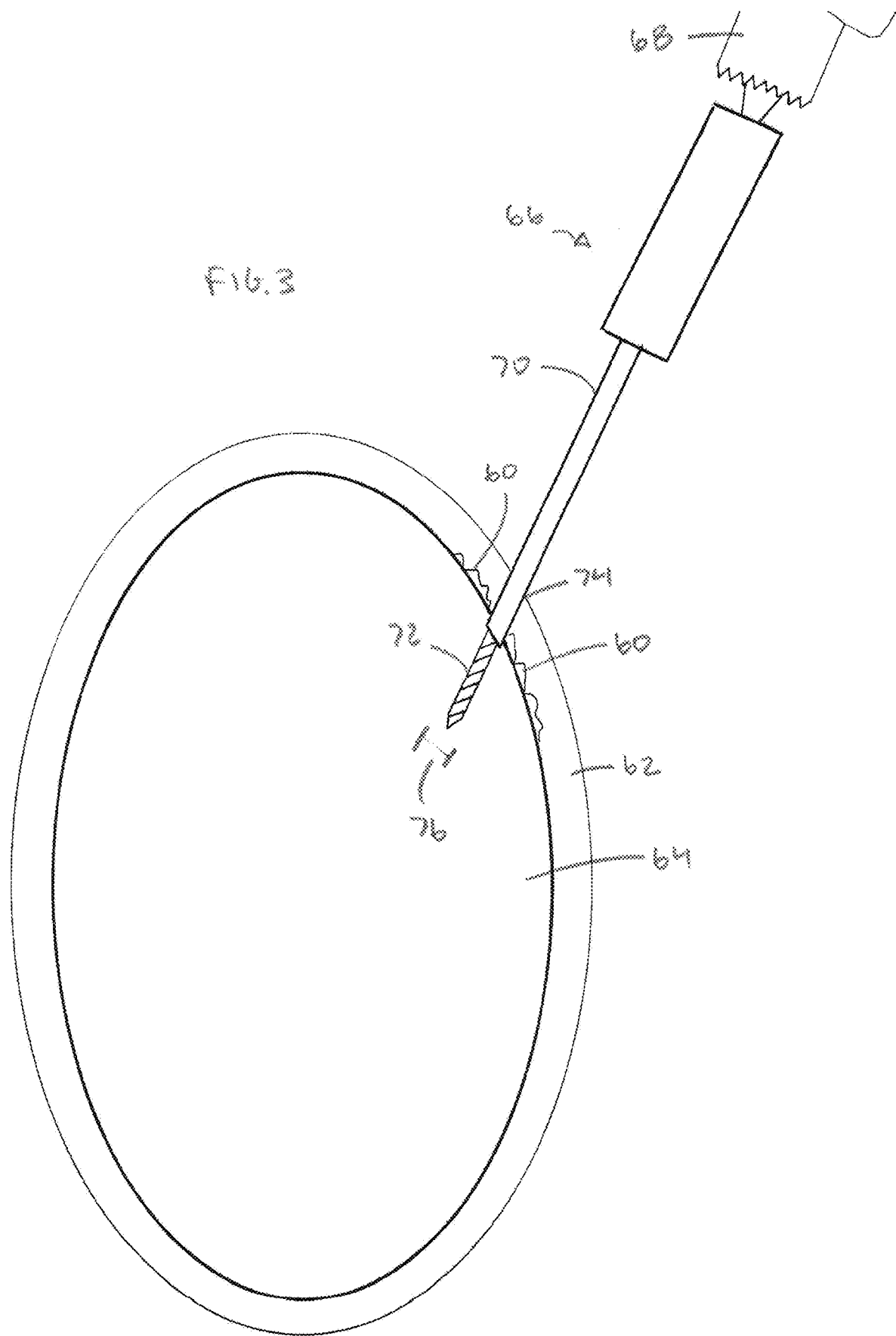
FIG. 3 illustrates surgical site preparation for tissue repair utilizing the principles of the present disclosure.

Before utilizing the construct 10 of the present disclosure to repair an injury, the surgical site needs to be prepped. FIG. 3 depicts a portion of such preparation to an injured area 60 of soft tissue 62. By way of example, the injured area 60 may be a first or soft tissue 62 torn from a second or bone tissue 64. In this case a drill assembly 66 comprised of a drill 68, drill guide sleeve 70 and drill bit 72 drills a hole/tunnel/ socket 74 next to (and/or through) the soft tissue 62 and into the bone 64. This tunnel 74 having a width 76.

Figure 4:
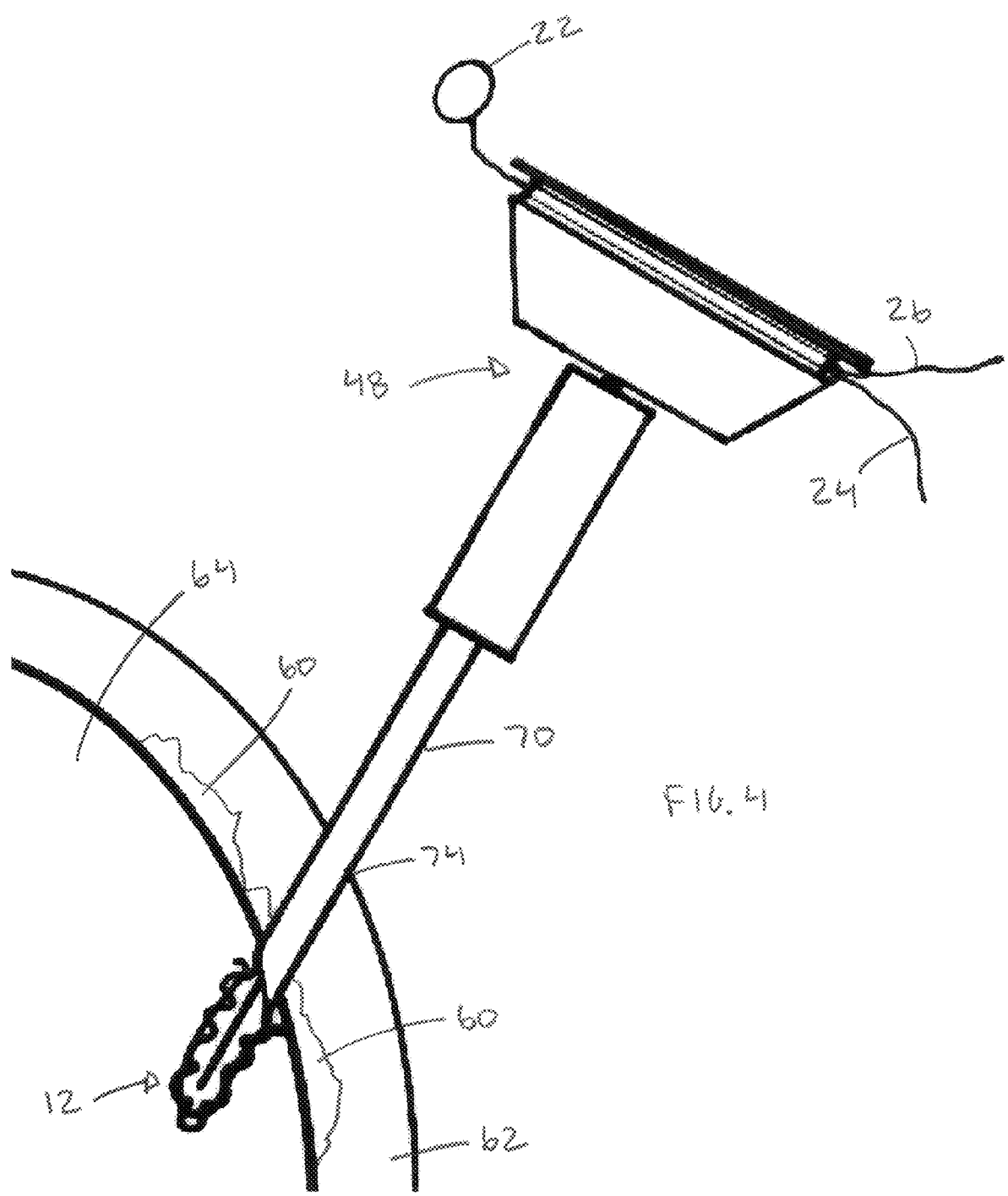
FIG. 4 illustrates insertion of the surgical assembly of FIG. 2 into the prepared tissue repair site.

Once the site has been prepared, the socket 74 is ready to receive the construct 10. This insertion step is shown in FIG. 4. The driver 48 is positioned above the site and the surgeon inserts the anchor 12 (with or without the drill guide sleeve 70) into the tunnel 74. The soft anchor body implant 12 is secured into the bone 64. The shuttle suture 20 and the repair suture 26 are then released from the driver 48, and the driver is removed from the site. At this stage, the flat anchor may be initially lightly seated by pulling all three suture limbs (22, 24, 26) to create accordion pleat and multiplication of anchor construct size to engage interior bone tissue. However, this need not be done prior to any suture passing or shuttling.

Figure 5:
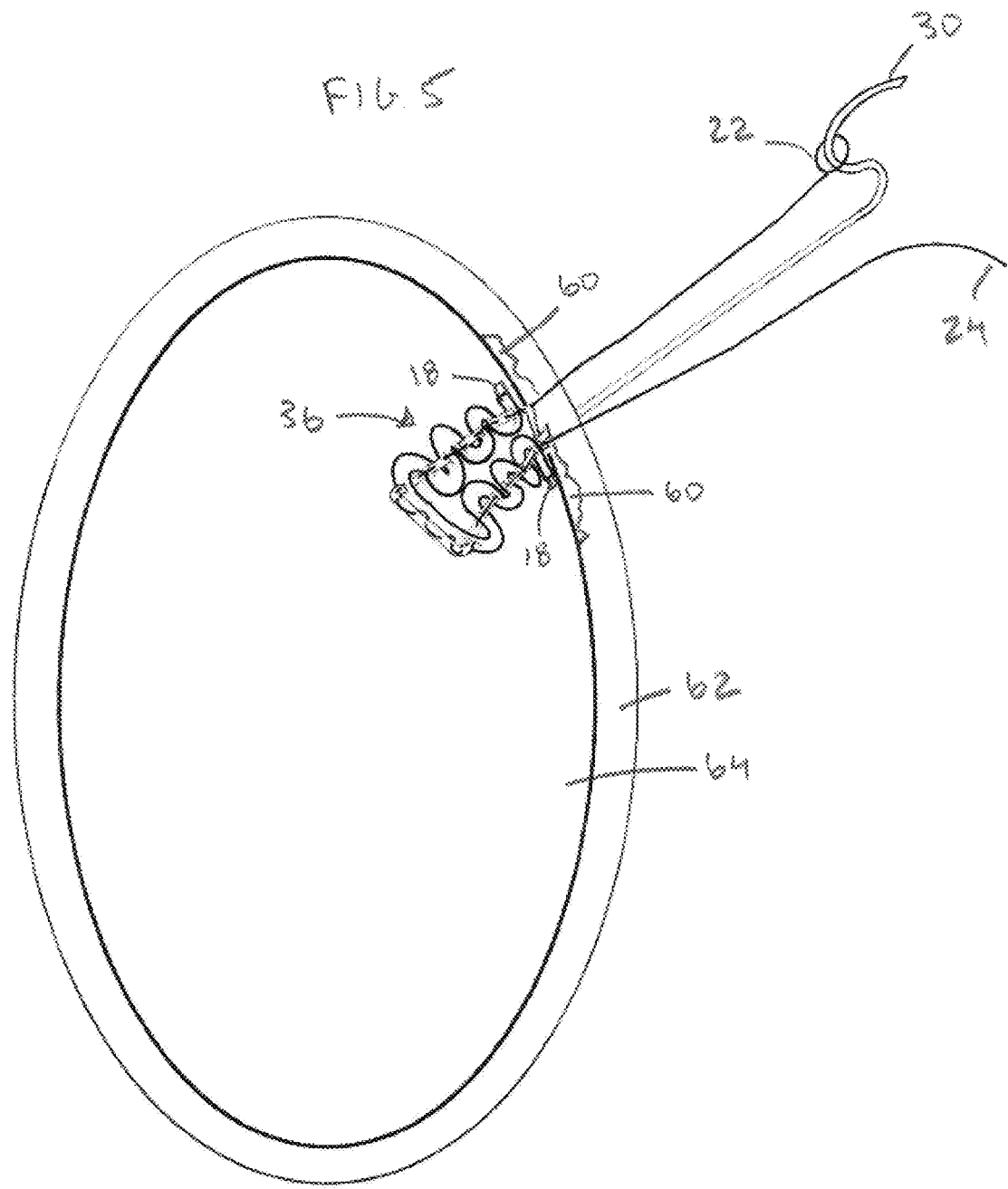
FIG. 5 illustrates a repair step of an exemplary method of tissue repair utilizing the construct of FIG. 1.

Referring now to FIG. 5 and the repair of the injured area 60, repair suture 26 is passed through (or around) as many times as may be necessary to create the repair stitch in the tissue of the injured area 60 which is to be reattached to the bone 64. The repair suture end 30 is subsequently passed through (folded, tied, etc.) the eyelet/loop 22 of the shuttle suture or suture passing device. The suture shuttle tail end 24 is then pulled thereby pulling the suture 26 through the anchor and weave and then the shuttle 20 exits the construct. This pull creates tension within the accordion weave region 36 of the anchor body 12 and the deployed anchor 12 is accordingly expanded, via the accordion pleat weave, to multiple times its insertion size and block the anchor 12 from traversing the tunnel 74. This, together with the wings 18 of the body now expanding or flaring out and engaging the bone, creates a secure anchor for the suture.

Figure 6:
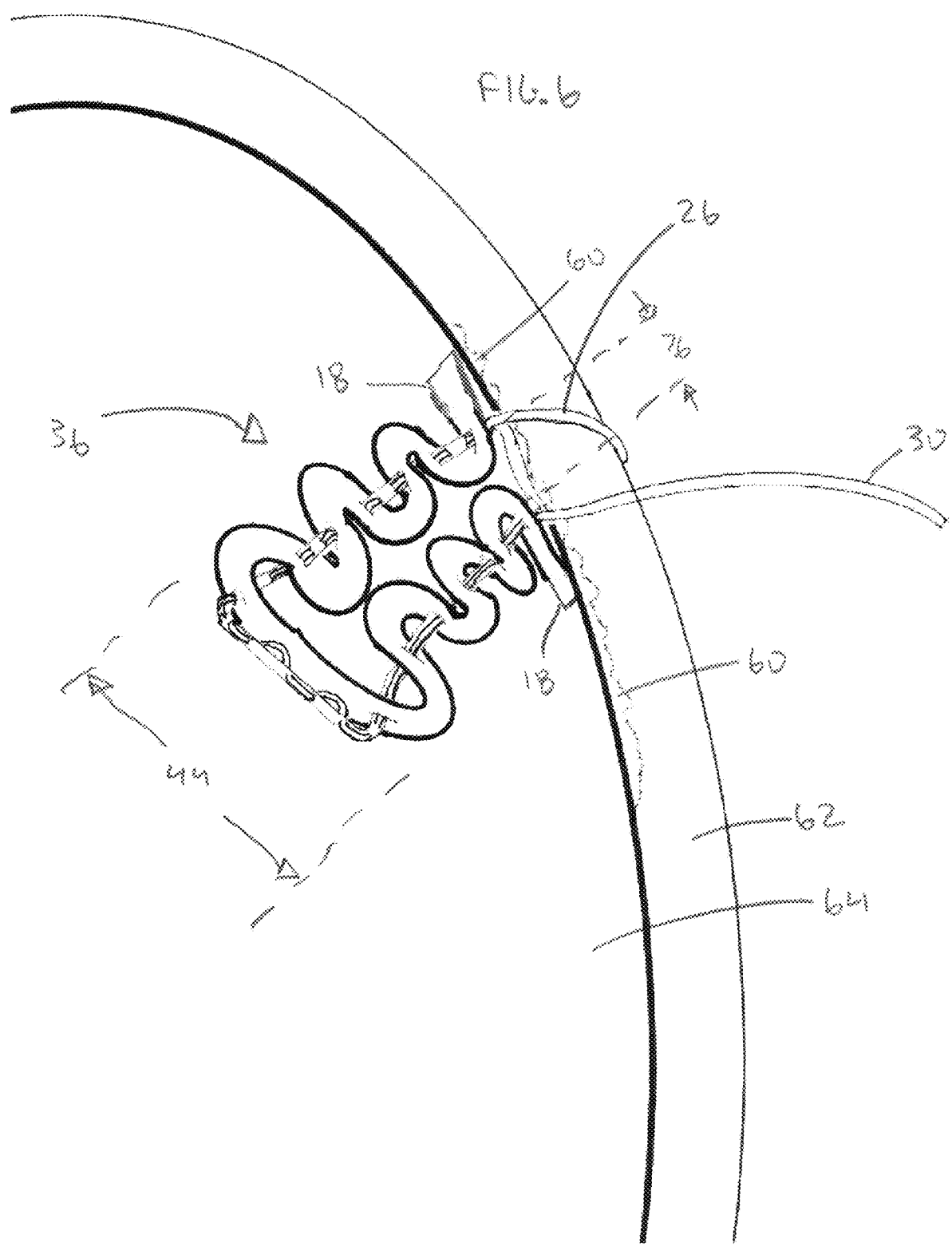
FIG. 6 illustrates a tightening and locking step of an exemplary method of tissue repair utilizing the construct of FIG. 1.

Turning now to FIG. 6, once the repair stitch has been fully passed through itself, the end 30 may be pulled until the injured tissue 60 has been moved to the desired location and the construct 10 locked. Once the tension and location is achieved, the end 30 may be clipped off to complete the soft tissue repair or fixation. In order to accomplish and complete same, the repair suture 26 is shuttled and pulled by the surgeon to a desired tension against the secured anchor and is locked. More particularly, after the suture limbs (22, 24, 26) have been pulled and locked, the anchor tails 18 are seated against the inside tissue at the channel opening and the width 44 of the construct is greater than the width 76 of the channel, thereby securely locking the anchor in place.

Figure 7:
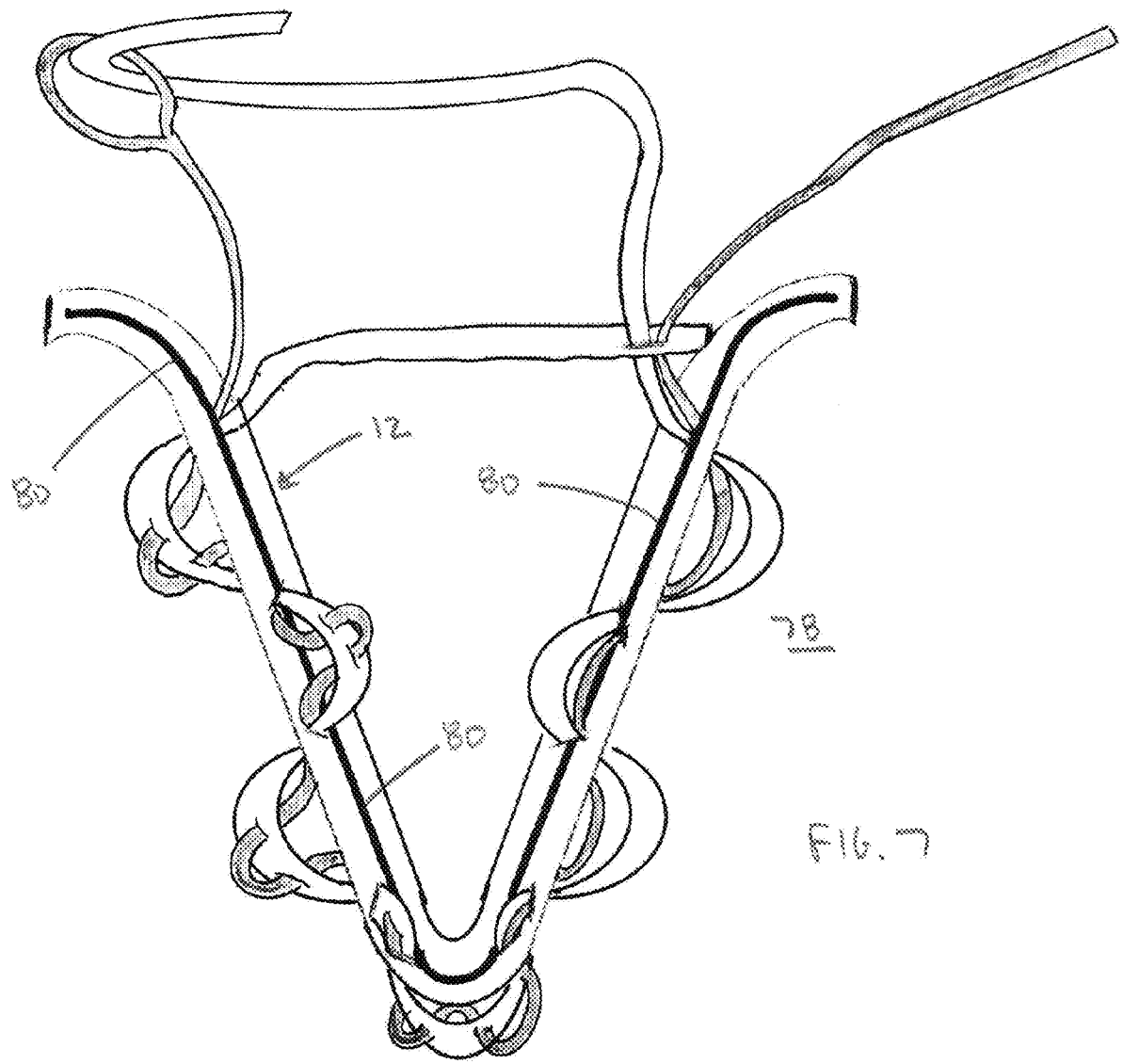
FIG. 7 is a side plan view of another embodiment according to the principles of the present disclosure.

Alternate embodiments of the tapetak of the present disclosure will now be described with the aid of FIGS. 7-12. Turning first to FIG. 7, the construct 78 is similar to the construct 10 of FIG. 1 except for the addition of the soft anchor body encompassing a nitinol wire or any other metallic, plastic, adsorbable, semi rigid or rigid material known in the art. Such a reinforcement member 80 will provide extra strength while maintaining the necessary flexibility and dimensional changes.

Another alternate embodiment is shown in FIG. 8. The construct 82 is again similar to the construct 10 of FIG. 1 except here the terminal end of the repair suture 26 is preferrable docked at the approximate middle point 54 of the anchor 12. As before, this termination applies the counter traction to lock the repair stitch and adjustable loop 42. Similarly, the alternate embodiment of FIG. 9 shows a construct 86 with the terminal end 84 preferably approximate the middle point 54. An additional flexible loop 88 is included to create counter traction and additional friction thereby creating an even stronger self-locking mechanism. It will be appreciated that, depending on the specific design, the terminal end may be docked anywhere within the anchor.

FIG. 10 is an example of an alternate embodiment of the present tapetak that can be used for an ACL repair/reconstruction, and other surgeries. This construct 90 consists of a pair of anchors 12 coupled (spliced, passed through, overlayed, etc.) together near their mid points 54. Such a construct may be placed through the midpoint of the anchor body to facilitate passing and implanted from inside out fashion via shuttle suture or any other passing device known in the art. Generally flat sutures 92 are inter woven in accordion fashion through multiple points in each anchor 12. These sutures are stitched, passed through, over or around soft tissue and/or bone (supra) via adjustable loops 94 and the construct 90 is locked into place about the injury.

The last two Figures, 11 and 12, illustrate the more simplified versions of the subject tapetak. The construct 96 of FIG. 11 illustrates an anchor 12 with weaved through sutures 92 and a flexible loop 88 to create the counter traction. And, the simplified construct 98 of FIG. 12 illustrates the flat knotless self-locking anchor including the anchor body 12 with tails 18 and the sutures 92 interwoven therein.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

I claim:

1. A surgical construct for anchoring tissue, the construct comprising:
    a generally flat flexible suture anchor body;
    a first suture woven through said anchor at multiple points to form a weave region, wherein said first suture has two ends, one of said ends terminated within said body and the other being a repair end;
    a second suture woven through said anchor body at multiple points within said weave region;
    the construct having a first dimension during insertion at a surgical site and a second dimension when positioned and tightened; and
    wherein said second dimension is larger than said first dimension.

2. The construct as defined by claim 1 wherein said anchor body is generally V-shaped having two ends.

3. The construct as defined in claim 2 further having a second anchor body wherein said anchor bodies are coupled proximate their midpoints.

4. The construct as defined in claim 1 wherein said first suture is generally flat.

5. The construct as defined in claim 1 wherein said second suture is generally flat.

6. The construct as defined in claim 1 wherein said second suture has two ends, one of said ends of said second suture being a shuttle end and the other being a pulling end.

7. The construct as defined in claim 1 wherein said dimension is a width defined by said anchor body whereby said construct is configured to traverse a tunnel in said first dimension and engage tissue in said second dimension.

8. The construct as defined in claim 1 wherein said dimension is increased when said weave region accordions.

9. The construct ad defined in claim 1 wherein said anchor body includes a reinforcement member.

* * * * *